United States Patent
Shen et al.

(10) Patent No.: US 11,694,017 B2
(45) Date of Patent: Jul. 4, 2023

(54) TEMPERATURE-BASED ON BOARD PLACEMENT OF MEMORY DEVICES

(71) Applicant: MICRON TECHNOLOGY, INC., Boise, ID (US)

(72) Inventors: Zhenlei Shen, Milpitas, CA (US); Tingjun Xie, Milpitas, CA (US); Charles See Yeung Kwong, Redwood City, CA (US)

(73) Assignee: Micron Technology, Inc., Boise, ID (US)

( * ) Notice: Subject to any disclaimer, the term of this patent is extended or adjusted under 35 U.S.C. 154(b) by 314 days.

(21) Appl. No.: 16/930,158

(22) Filed: Jul. 15, 2020

(65) Prior Publication Data

US 2022/0019722 A1    Jan. 20, 2022

(51) Int. Cl.
| G06F 30/00 | (2020.01) |
| G06F 30/398 | (2020.01) |
| G06F 30/392 | (2020.01) |
| G06F 11/30 | (2006.01) |
| G06F 119/08 | (2020.01) |

(52) U.S. Cl.
CPC ........ *G06F 30/398* (2020.01); *G06F 11/3058* (2013.01); *G06F 30/392* (2020.01); *G06F 2119/08* (2020.01)

(58) Field of Classification Search
CPC .. G06F 30/398; G06F 11/3058; G06F 30/392; G06F 2119/08; G06F 11/3037; G06F 11/3409; G06F 3/0631; G06F 3/0679; G11C 29/50; G11C 29/42; G11C 2029/0403; G11C 7/04; G11C 2029/5002

USPC ........................................ 714/718, 763, 773
See application file for complete search history.

(56) References Cited

U.S. PATENT DOCUMENTS

| 10,152,997 B1* | 12/2018 | Chu .................. G11B 5/607 |
| 10,365,854 B1* | 7/2019 | Muchherla ............ G06F 3/0649 |
| 2010/0085196 A1* | 4/2010 | Stiver ................ H05K 7/20836 |
| | | 702/136 |
| 2012/0102259 A1* | 4/2012 | Goss ...................... G11C 16/26 |
| | | 711/E12.001 |
| 2014/0047301 A1* | 2/2014 | Kurata .................. G06F 1/3275 |
| | | 714/773 |
| 2016/0342344 A1* | 11/2016 | Kankani ............... G06F 3/0644 |
| 2017/0004040 A1* | 1/2017 | Chinnakkonda Vidyapoornachary ...................... |
| | | G06F 3/0619 |
| 2017/0139761 A1* | 5/2017 | Song ....................... G06F 12/02 |
| 2020/0019458 A1* | 1/2020 | Cadloni ................. G11C 29/44 |
| 2020/0264936 A1* | 8/2020 | Gurram ................. G06F 9/5044 |
| 2020/0333976 A1* | 10/2020 | Cariello ................... G01K 3/00 |
| 2020/0342927 A1* | 10/2020 | Zhao ..................... G11C 11/161 |

(Continued)

*Primary Examiner* — Albert Decady
*Assistant Examiner* — Osman M Alshack
(74) *Attorney, Agent, or Firm* — Lowenstein Sandler LLP

(57) ABSTRACT

A quality rating for a memory device to be installed at a memory sub-system is determined, where the quality rating corresponds to a performance of the memory device at one or more operating temperatures. A determination is made whether the quality rating for the memory device satisfies a first quality rating condition associated with a first temperature zone of two or more temperature zones of the memory sub-system. Responsive to the determination that the quality rating for the memory device satisfies the first quality rating condition, the memory device is assigned to be installed at a first memory device socket of the first temperature zone.

20 Claims, 10 Drawing Sheets

(56) References Cited

U.S. PATENT DOCUMENTS

2020/0401514 A1* 12/2020 Liang ................ G06F 12/0253

* cited by examiner

TEMPERATURE-BASED ON BOARD PLACEMENT OF MEMORY DEVICES

TECHNICAL FIELD

Embodiments of the disclosure relate generally to memory sub-systems, and more specifically, relate to temperature-based on board placement of memory devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
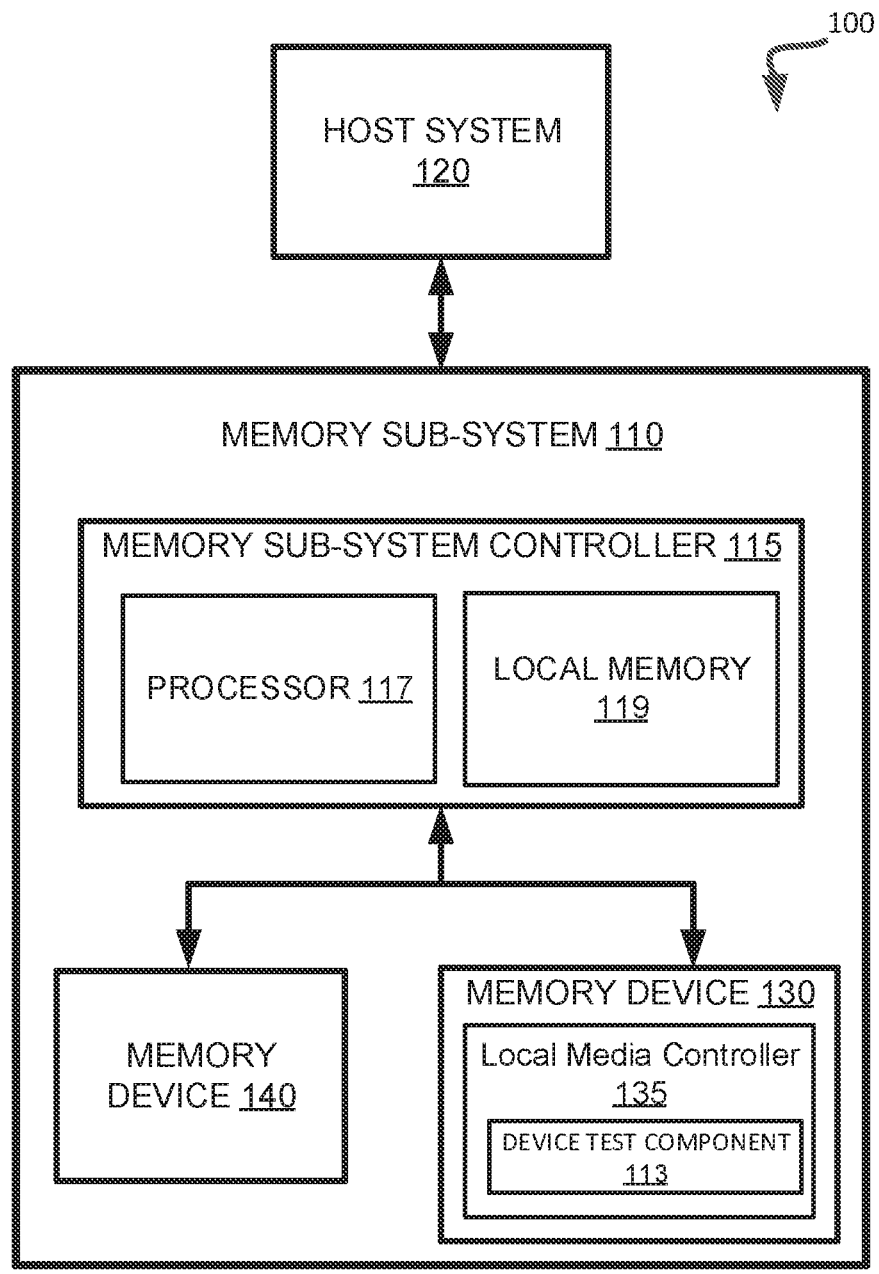
FIG. 1 illustrates an example computing environment that includes a memory sub-system, in accordance with some embodiments of the present disclosure.

Aspects of the present disclosure are directed to temperature based on board placement of memory devices. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components (also hereinafter referred to as "memory devices"). The host system can provide data to be stored at the memory sub-system and can request data to be retrieved from the memory sub-system.

A memory sub-system can be assembled in a manufacturing environment. Manufacturing equipment of the manufacturing environment can install one or more components of a memory sub-system controller at a memory sub-sub system controller socket of a memory sub-system board, such as a printed circuit board (PCB). The memory sub-system board can further include a number of memory device sockets to receive memory devices at fixed locations on the memory sub-system board. The manufacturing equipment can further install multiple memory devices to these memory device sockets.

Components of a memory sub-system controller can be frequently utilized during operation of the memory sub-system. For example, components of the memory sub-system controller can be utilized for each operation performed at the memory sub-system. Components of the memory sub-system controller emit heat that radiates away from the memory sub-system controller during operation. The emitted heat radiates towards the memory devices on the memory sub-system board, causing in an increased temperature for an environment surrounding a memory device during operation of the memory device (referred to as an operating temperature). Thus, the operating temperature of memory devices installed adjacent to or close to the memory sub-system controller can be higher than an operating temperature of memory devices installed further from the memory sub-system controller.

The performance of a memory device can refer to a quality of data stored at the memory device (e.g., a number of errors present in said data) and an efficiency of an operation performed at the memory device. In some instances, the performance of a memory device can be measured based on an error rate of operations performed at the memory device, an endurance of a memory device (i.e., a total amount of data that can be written over the life of the memory device), a latency of the memory device, a throughput of the memory device, and so forth. Due to the process used to fabricate the memory devices, the performance of one memory device can differ from a performance of another memory device. For example, the performance of one memory device can be lower than a performance of another memory device due to an error that occurred during fabrication of the memory device.

Conventional manufacturing equipment randomly installs a memory device to a memory device socket at a memory sub-system board. As a result, a memory device associated with a low performance is often installed at a memory device socket located adjacent to or close to the memory sub-system controller where there is a higher operating temperature and a memory device associated with a high performance is often installed at a memory device socket further from the memory sub-system controller where there is a lower operating temperature. The heat radiating from the memory sub-system controller can cause the low-performing memory device to increase to a higher operating temperature than the high-performing memory device.

A low-performing memory device exposed to a high operating temperature generally degrades more quickly than if the memory device were exposed to a low operating temperature. For example, one or more memory cells of the memory device exposed to a high operating temperature can begin degrading earlier than if the memory device were exposed to a low operating temperature. The degradation of memory cells can cause a decrease in the overall performance (e.g., an increase in operation error rate, a decrease in endurance, an increase in latency, a decrease in throughput, etc.) for the memory device, thereby shortening the lifespan of the memory device. In contrast, a high-performing memory device exposed to a high operating temperature degrades at a similar or approximately the same rate as if the memory device were exposed to a low operating temperature.

As a result of the low-performing memory device being installed adjacent to or close to the memory sub-system controller, the low-performing memory device will degrade more quickly than the high-performing memory device. Further, in some memory sub-systems, data that is frequently accessed by a host system can be stored at memory devices that are closer to the memory sub-system controller and data that is less frequently accessed by the host system can be stored at memory devices that are further from the memory sub-system controller. This is commonly referred to as spatial locality of memory. In such memory sub-systems, a low-performing memory device installed adjacent to or close to the memory sub-system controller can be frequently accessed by the host system. Over time, the low-performing memory device can cause a bottleneck for operations performed at the memory sub-system, thereby reducing the overall long-term performance of the memory sub-system.

Aspects of the present disclosure address the above and other deficiencies by providing temperature based memory device installation at a memory sub-system board. A manufacturing component of a manufacturing environment can associate each memory device socket of a memory sub-system board with a corresponding temperature zone. In some embodiments, each temperature zone can be defined based on a proximity to a memory sub-system controller installed on the memory sub-system board. For example, a first set of memory device sockets can be included in a first temperature zone that is adjacent to or close to the memory sub-system controller and a second set of memory device sockets can be included in a second temperature zone that is further from the memory sub-system controller.

The manufacturing component can determine a quality rating for a memory device to be installed at the memory sub-system board. A quality rating can be a metric indicating how susceptible a memory device will be to changes in operating temperature. In some instances a quality rating can correspond to a performance of the memory device at one or more operating temperatures. For example, the manufacturing component can measure a performance (e.g., an operation error rate, an endurance, a latency, a throughput, etc.) of the memory device at different operating temperatures. The manufacturing component can determine a quality rating for the memory device based on a difference of a performance of the memory device at the different operating temperatures. The manufacturing component can assign the memory device to be installed at a memory device socket of the first temperature zone responsive to determining the quality rating for the memory device satisfies a quality rating condition associated with the first temperature zone. The manufacturing component can assign the memory device to be installed at a memory device socket of the second temperature zone responsive to determining the quality rating for the memory device does not satisfy the quality rating condition.

In other or similar embodiments of the present disclosure, the manufacturing component can determine a temperature zone rating for each temperature zone of the memory sub-system board. The manufacturing component can determine a quality rating for each of a set of memory devices to be installed at the memory sub-system board. The manufacturing component can assign each memory device of the set of memory devices to be installed at a temperature zone having a temperature zone rating that corresponds to a quality rating for the respective memory device.

Advantages of the present disclosure include, but are not limited to, installing a memory device at a memory device socket of a particular temperature zone based on a quality of the memory device (i.e., a difference in a performance of the memory device exposed to different operating temperatures). In accordance with embodiments of the present disclosure, high-performing memory devices are installed at temperature zones associated with higher operating temperatures (i.e., adjacent to or close to the memory sub-system controller) while low-performing memory devices are installed at temperature zones associated with lower operating temperatures (i.e., further from the memory sub-system controller). By installing low-performing memory devices at temperature zones associated with lower operating temperatures, the low-performing memory devices will degrade much more slowly than if the low-performing memory devices were installed in a temperature zone adjacent to or close to a memory sub-system controller. As such, an overall memory sub-system performance, as well as an overall memory sub-system lifetime, will increase.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., processing device) configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

In some instances, one or more tests can be performed for a memory device 130, 140 prior to the memory device 130, 140 being installed at a memory sub-system 110. For example, prior to a memory device 130 being installed at memory sub-system 110, memory device 130 can be tested at testing equipment of a manufacturing environment. Memory device 130 can be inserted at the testing equipment. A manufacturing component of the manufacturing environment can perform one or more operations at the memory device inserted at the testing equipment. Local media controller 135 of memory device 130 can include a memory device testing component 113 that can collect testing data associated with the one or more operations performed at the memory device 130. The testing data can include any data used to determine a performance of the memory device (e.g., an endurance, an operation error rate, a latency, a throughput, etc.). For example, the testing data can include a number of errors that occurred during performance of the one or more operations at the memory device, an amount of time between an instance the operation was initiated and an instance the operation was completed, and so forth. Responsive to collecting the testing data, the memory device testing component can transmit the testing data to the manufacturing component. Further details with regards to the operations of the memory device testing component 113 and the manufacturing component are described with respect to FIG. 2 below.

Figure 2:
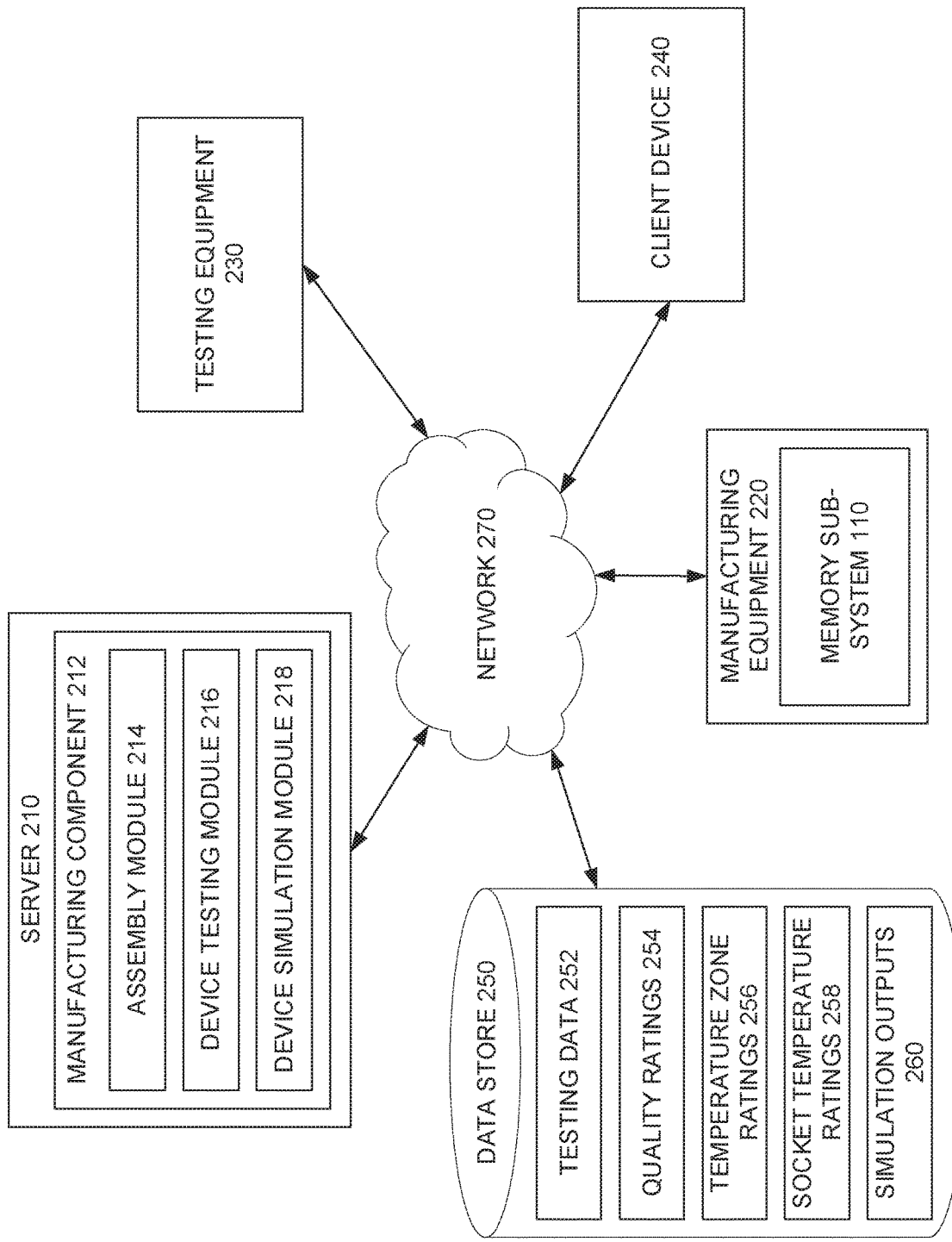
FIG. 2 illustrates an example manufacturing environment, in accordance with some embodiments of the present disclosure.

FIG. 2 illustrates an example manufacturing environment 200, in accordance with some embodiments of the present disclosure. Manufacturing environment 200 can include a server 210, manufacturing equipment 220, testing equipment 230, a client device 240, and a data store 250. In some embodiments, each of server 210, manufacturing equipment 220, testing equipment 230, client device 240, and data store 250 can be connected via a network 270.

Server 210 can include a manufacturing component 212 that is configured to facilitate one or more processes at manufacturing environment 200. In some embodiments, manufacturing component 212 can include a memory sub-system assembly module 214 (referred to herein as assembly module 214), a memory device testing module 216 (referred to herein as device testing module 216), and a memory device simulation module 218 (referred to herein as device simulation module 218). Assembly module 214 is configured to facilitate assembly of a memory sub-system, such as memory sub-system 110, at manufacturing equipment 220. As described with respect to FIG. 1, memory sub-system 110 can include a memory sub-system controller 115 and memory devices 130, 140. Memory sub-system controller 115 can include a processor 117 and a local memory device 119. Memory sub-system 110 can further include a memory sub-system board, such as a printed circuit board (PCB). Each of the processor 117, the local memory 119, and the memory devices 130 can installed at particular portions of the memory sub-system board, also referred to as sockets, as shown in FIGS. 5A-5E. In some embodiments, the memory sub-system board can include a processor socket, a local memory device socket, and two or more memory device sockets. Assembly module 214 can transmit instructions to manufacturing equipment 220 to install a processor 117 at the processor socket, a local memory device 119 at the local memory device socket, and each memory device 130, 140 at a memory device socket.

The processor 117 and/or the local memory device 119 of the memory sub-system controller 115 can be frequently utilized during operation of the memory sub-system 110. For example, processor 117 and/or local memory device 119 can be utilized for each request to access memory at a memory device 130, 140 of the memory sub-system 110. As a result, the processor 117 and/or the local memory device 119 emits heat that radiates away from the memory sub-system controller 115. The heat radiating from the memory sub-system controller 115 can cause an operating temperature of one or more memory devices 130, 140 installed at the board to increase. As described previously, an operating temperature refers to a temperature of an environment surrounding a memory device 130, 140 during operation of the memory device 130, 140. An operating temperature of memory devices 134, 140 installed at memory device sockets located closer to the memory sub-system controller 115 can be higher than an operating temperature of memory devices 130, 140 installed at memory device sockets positioned farther from the memory sub-system controller 115. Based on this phenomena, assembly module 214 can associate each memory device socket of the memory sub-system board to a temperature zone.

In some embodiments, assembly module 214 associates a memory device socket to a temperature zone based on a proximity of the memory device socket to the memory sub-system controller 115. For example, assembly module 214 can identify a first set of memory device sockets and a second set of memory device sockets where each of the first set of memory device sockets are located closer to the memory sub-system controller 115 than each of the second set of memory device sockets. Assembly module 214 can associate each of the first set of memory device sockets to be included in a first temperature zone and each of the second set of memory device sockets to be included in a second temperature zone.

In other or similar embodiments, assembly module 214 associates a memory device socket to a temperature zone based on a temperature rating 258 of each memory device socket of the memory sub-system board (referred to as a socket temperature rating 258). A socket temperature rating 258 for a memory device socket corresponds to an operating temperature of a memory device installed at the memory device socket. In some embodiments, a socket temperature rating 258 can be a ranking of a measured or simulated operating temperature of a memory device installed at a memory device socket. For example, a memory device socket associated with a highest measured or simulated memory device operating temperature is associated with a highest socket temperature rating 258 and a memory device socket associated with a lowest measured or simulated memory device operating temperature. A measured or simulated operating temperature of a memory device can be obtained in accordance with embodiments described below.

In some embodiments, device simulation module 218 may run a simulation of one or more operations performed at a simulated memory device installed at a memory device socket of the memory sub-system board. An output 260 of the simulation may include a simulated operating temperature of the simulated memory device at the memory device socket. Device simulation module 218 can store the simulation output 260 at data store 250. Responsive to device simulation module 218 obtaining the simulation output 260, assembly module 214 can determine a socket temperature rating 258 for a memory device socket based on the simulation output 260 for the memory device socket (i.e., a ranking of the simulated operating temperature of the simulated memory device installed at the memory device socket).

In other or similar embodiments, the socket temperature rating 258 can be determined based on a measured operating temperature of a memory device installed at a memory sub-system that is similar to memory sub-system 110 (referred to as a second memory sub-system). For example, manufacturing equipment 220 can assemble a second memory sub-system by installing memory devices to memory device sockets of a second memory sub-system board. The second memory device can be used by a host system 120 in accordance with previously described embodiments. Manufacturing component 212 can receive measured operating temperatures from the host system 120 or a component of the second memory sub-system (e.g., a memory sub-system controller). Assembly module 214 can map each received operating temperature to a memory device socket to the memory sub-system board of memory sub-system 110. Assembly module 214 can determine a socket temperature rating 258 for each memory device socket of the memory sub-system board of memory sub-system 110 based on the mapped operating temperature of a memory device measured from the second memory sub-system 110.

Assembly module 214 can associate a memory device socket with a temperature zone based on a socket temperature rating 258 for each memory device socket of a memory sub-system board and a number of temperature zones to be included at the memory sub-system board. In some embodiments, assembly module 214 can determine the number of temperature zones to be included at the memory sub-system board by receiving a notification of a number of temperature zones to be included at the memory sub-system board. In an illustrative example, assembly module 214 can determine there are to be two temperature zones at the memory sub-system board. Assembly module 214 can identify a first set of memory device sockets and a second set of memory device sockets where each of the first set of memory device sockets are associated with a higher socket temperature rating 258 than each of the second set of memory device sockets. Assembly module 214 can associate each of the first set of memory device sockets to be included in the first temperature zone and the second set of memory device sockets to be included in the second temperature zone.

In some embodiments, assembly module 214 can further determine a temperature zone rating 256 for one or more temperature zones of the memory sub-system board. A temperature zone rating 256 may correspond to a socket temperature rating 258 for each memory device socket included in the temperature zone. In some embodiments, assembly module 214 can determine the temperature zone rating 256 based on an average of socket temperature ratings 258 for each memory device socket included in the temperature zone. In other or similar embodiments, assembly module 214 can determine the temperature zone rating 256 based on a highest socket temperature rating 258 of each memory device socket included in the temperature zone. In accordance with the previous illustrative example, assembly module 214 may assign a higher temperate zone rating 256 to the first temperature zone than the second temperature zone, as the first temperature includes the first set of memory device sockets associated with higher socket temperature ratings 258.

Assembly module 214 can assign a memory device to be installed at a memory device socket included of a particular temperature zone of a memory sub-system board. In some embodiments, assembly module 214 can assign memory devices 130, 140 to memory device sockets included in particular temperature zones based on a quality rating 254 of a memory device. A quality rating 254 can be a metric indicating how susceptible a memory device 130, 140 will be to changes of operating temperature. In some embodiments, a quality rating 254 can correspond to a performance of the memory device 130, 140 at one or more operating temperatures. For example, assembly module 214 can determine a performance (e.g., an operation error rate, an endurance, a latency, a throughput, etc.) of the memory device 130, 140 at different operating temperatures. Assembly module 214 can determine a quality rating 254 for the memory device 130, 140 based on a difference of the performance of the memory device 130, 140 at the different operating temperatures.

In some embodiments, assembly module 214 can determine a quality rating 254 for a memory device based on testing data, such as testing data 252, collected for the memory device by device testing module 216. Device testing module 216 can facilitate testing of a memory device 130, 140 at testing equipment 230. In some embodiments, testing equipment 230 can include a memory device test rack including multiple memory device testing slots. A memory device 130, 140 can be inserted into a memory device testing slot. Device testing module 216 can execute one or more test operations to be performed at the memory device 130, 140 inserted into the memory device testing slot. For example, device testing module 216 can execute a read operation and a write operation to be performed at a memory device inserted into a memory device testing slot. In some embodiments, device testing module 216 can apply various conditions to a memory device inserted into a memory device testing slot. For example, device testing module 216 can execute an operation to cause test equipment 230 to set a particular operating temperature for the memory device 130, 140. A memory device test component, such as memory device test component 113 of FIG. 1, can collect testing data associated with the one or more operations performed at the memory device 130, 140. Device testing module 216 can receive the collected testing data and store the testing data at data store 252. Device testing module 216 can measure a performance of the memory device 130, 140 based on the collected testing data 252. Assembly module 214 can determine a quality rating 254 of a memory device the measured performance of the memory device, in accordance with embodiments described below. Although the present disclosure describes test equipment 230 as a test rack, test equipment 230 can include any type of memory device test equipment.

As described previously, assembly module 214 can assign a memory device 130, 140 to be installed at a memory device socket included in a particular zone of a memory sub-system board based on a quality rating 254 of the memory device. One or more temperature zones of a memory sub-system board can be associated with a temperature zone rating 256, in accordance with previously described embodiments. In some embodiments, the temperature zone rating 256 can correspond to a memory device quality rating condition. In such embodiments, assembly module 214 can assign a memory device to be installed at memory device socket included in a temperature zone in response to determining a quality rating 254 of the memory device satisfies the memory device quality rating condition for the temperature zone. In one embodiment, the quality rating 254 of the memory devices satisfies the memory device quality rating condition if the quality rating 254 is greater than a quality rating threshold. In other or similar embodiments, the temperature zone rating 256 can provide an indication to assembly module 214 that memory device sockets included in the temperature zone are associated with a particular socket temperature rating 258. Further details regarding the temperature zone rating 256 are provided below.

In some embodiments, assembly module 214 can transmit a notification of an assignment for a memory device 130, 140 to an operator of the manufacturing environment 200. For example, assembly module 214 can generate a notification indicating a particular memory device 130, 140 is to be installed at memory device socket of a particular temperature zone of a memory sub-system board. Assembly module 214 can transmit the notification to client device 240. Client device 240 can provide the notification to the operator of the manufacturing environment 200 via a user interface of the client device 240. In other or similar embodiments, assembly module 214 can transmit a notification of an assignment for a memory device 130, 140 to one or more components of manufacturing equipment 220. Responsive to receiving the notification, manufacturing equipment 220 can install the memory device at a memory device socket of an assigned temperature zone, in accordance with the notification.

Figure 3:
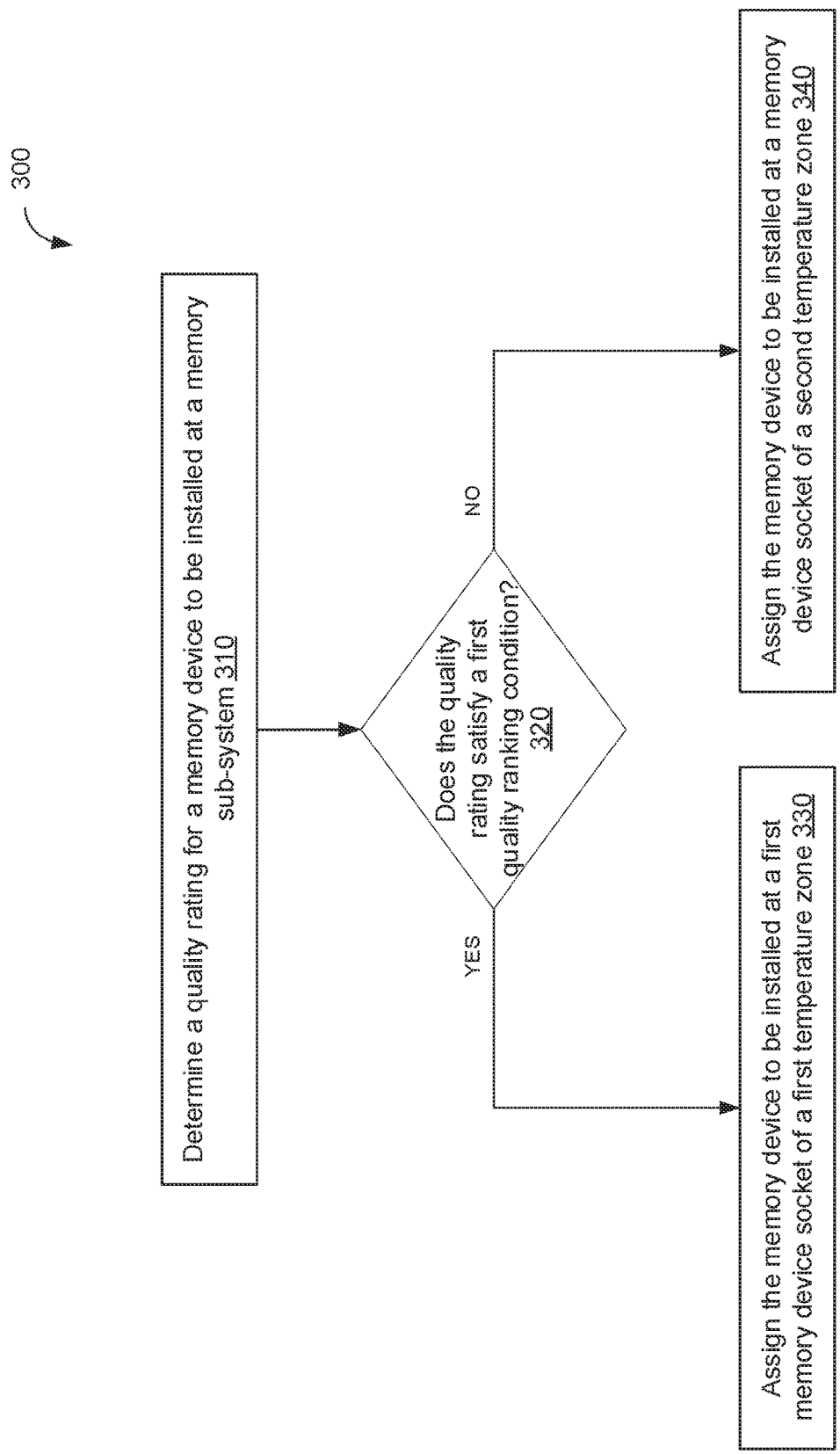
FIG. 3 is a flow diagram of an example method to assign a memory device to a memory device socket of a memory sub-system, in accordance with some embodiments of the present disclosure.

FIG. 3 is a flow diagram of an example method 300 to assign a memory device to a memory device socket of a memory sub-system, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the manufacturing component 212 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing device determines a quality rating, such as quality rating 254, for a memory device 130, 140 to be installed at a memory sub-system 110. In some embodiments, the quality rating 254 corresponds to a performance (e.g., an operation error rate, an endurance, a latency, a throughput, etc.) of the memory device 130, 140 at one or more operating temperatures. The processing device can determine the quality rating 254 of the memory device 130, 140 by testing the memory device 130, 140 at the one or more operating temperatures, in accordance with one or more previously described embodiments. For example, the memory device 130, 140 can be inserted into a slot of a memory device test rack. The processing device can set a first operating temperature for the memory device 130, 140, in accordance with previously described embodiments. The processing device can measure a first perfor-mance of one or more operations performed at the memory device 130, 140 at the first temperature condition.

In some embodiments, the one or more operations can be operations of a read-write-read test performed at the memory device 130, 140. For example, the processing device executes a first command to read data stored at a first portion of the memory device 130, 140. The processing device then executes a second command to write the data to a second portion of the memory device 130, 140. The processing device then executes a third command to read the data from the second portion of the memory device 130, 140. The processing device can compare a quality of the data (e.g., a number of errors included in the data) read from the first portion of the memory device 130, 140 to a quality of the data read from the second portion of the memory device 130, 140. The performance of the memory device 130, 140 can be measured based on a difference between the quality of the data read from the first portion of the memory device 130, 140 and the quality of the data read from the second portion of the memory device 130, 140.

Responsive to measuring the first performance of the one or more memory operations at the memory device 130, 140, the processing device can set a second operating temperature for the memory device 130, 140. The processing device can measure a second performance of the one or more operations at the memory device 130, 140 at the second operating temperature. In some embodiments, the one or more operations can be operations of a read-write-read test, as described above. In response to measuring the second performance of the one or more operations, the processing device can determine the quality rating for the memory device 130, 140. As described previously, the quality rating 254 of the memory device 130, 140 can correspond to a difference between the first performance of the memory device 130, 140 and the second performance of the memory device 130, 140.

At operation 320, the processing device determines whether the quality rating 254 of the memory device 130, 140 satisfies a first quality rating condition associated with a first temperature zone 530A of the memory sub-system. In some embodiments, the processing device determines the quality rating 254 satisfies the first quality rating condition by determining the quality rating 254 of the memory device 130, 140 exceeds a first quality rating threshold. Responsive to determining the quality rating of the memory device satisfies the first quality rating condition, the method 300 continues to operation 330. Responsive to determining the quality rating of the memory device does not satisfy the first quality rating condition, the method 300 continues to operation 340.

Figure 5A:
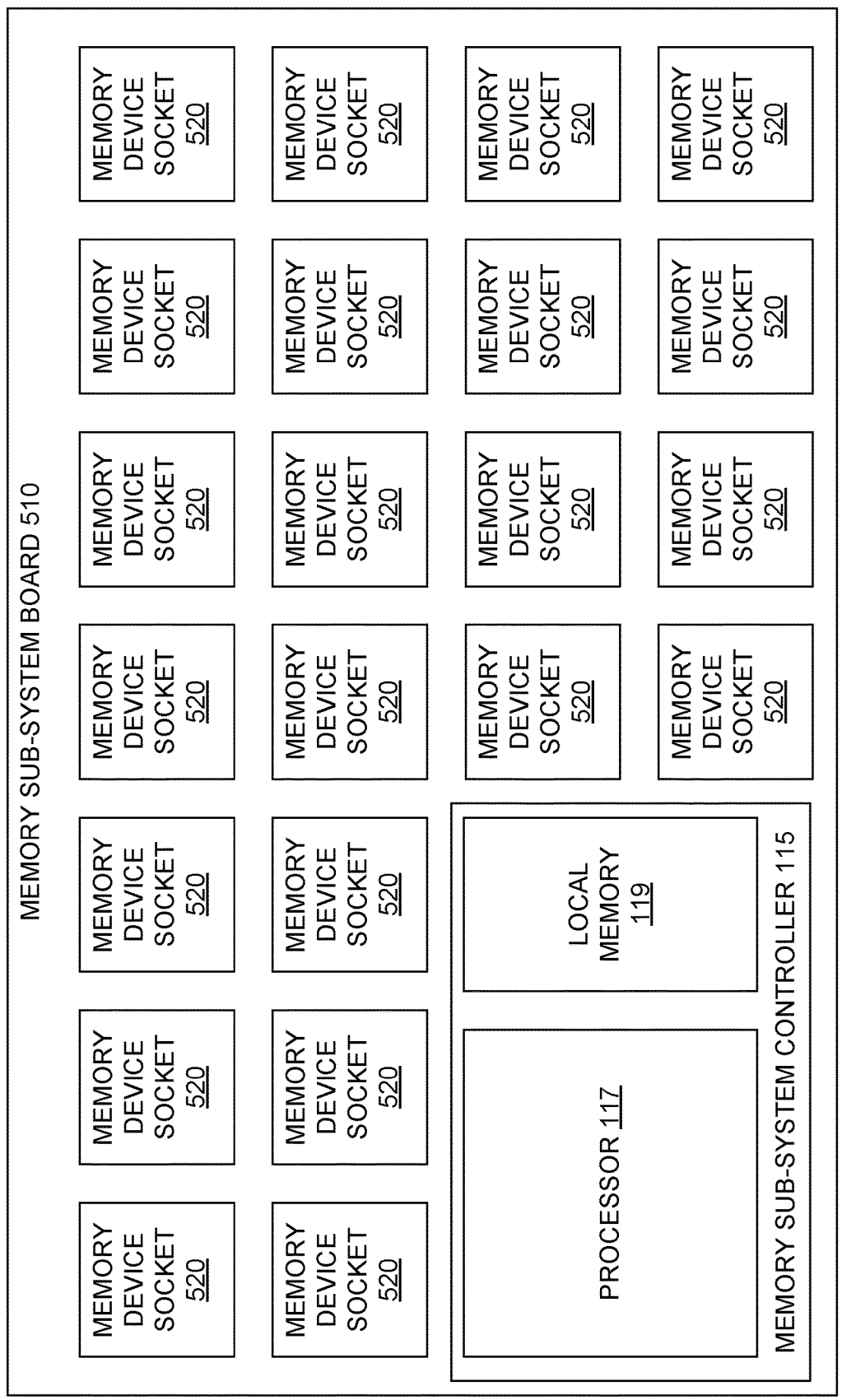
FIGS. 5A-5E illustrate assigning one or more memory devices to memory device sockets of a memory sub-system, in accordance with some embodiments of the present disclosure.

FIG. 5A illustrates a memory sub-system board 510, in accordance with previously described embodiments. One or more components of a memory sub-system controller 115 (i.e., a processor 117 and a local memory device 119) can be installed at a particular socket of memory sub-system board 510. Memory sub-system board 510 can further include memory device sockets 520. A memory device 130, 140 can be installed in each memory device socket 520.

Figure 5B:
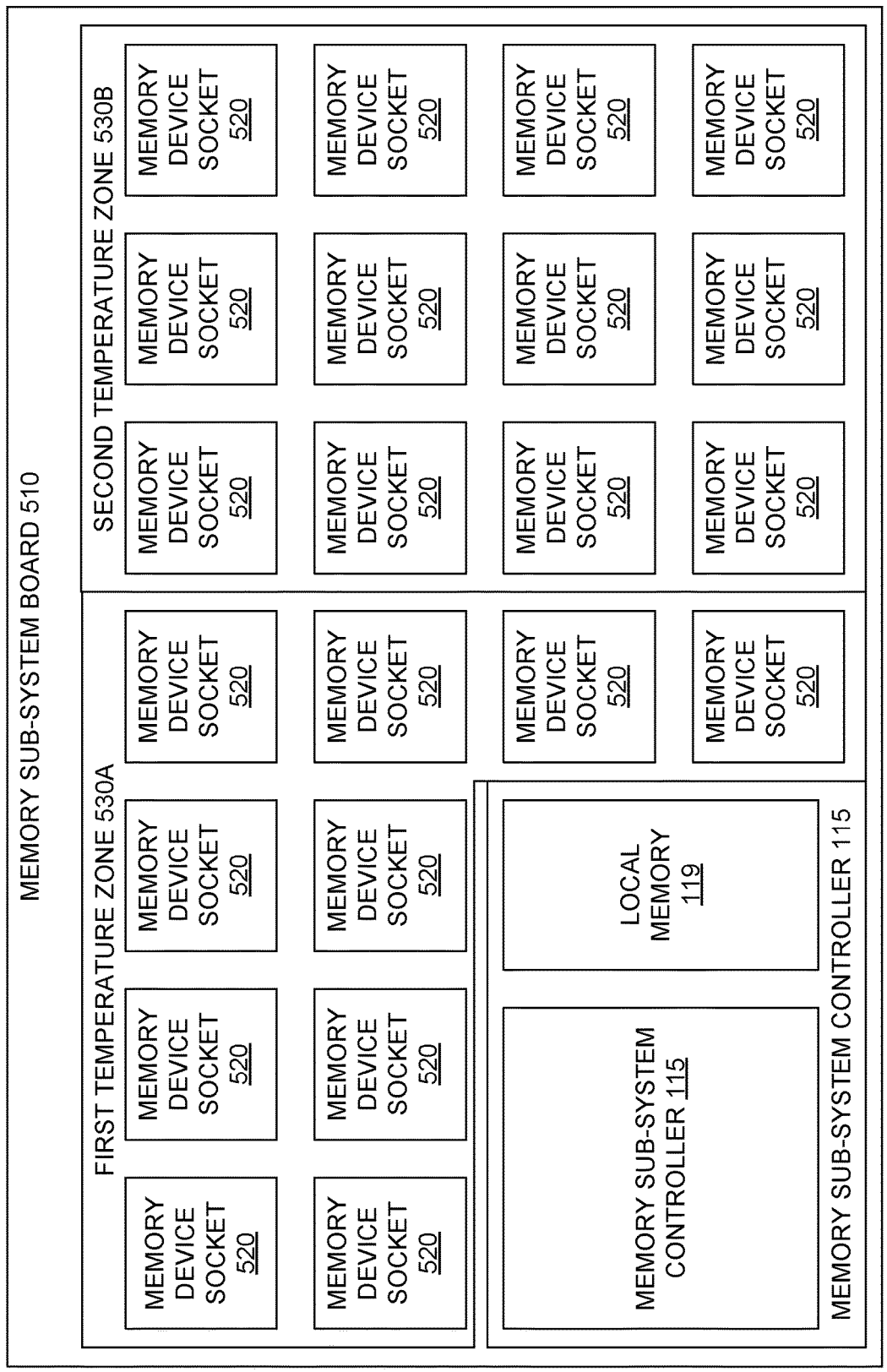

As described previously, memory sub-system board 510 can include two or more temperature zones 530. FIG. 5B illustrates a first temperature zone 530A and a second temperature zone 530B. Memory device sockets 520 included in each temperature zone 530 can be determined in accordance with previously described embodiments. In an illustrative example, memory sub-system board 510 can include two temperature zones (i.e., a "hot" temperature zone and a "cold" temperature zone). Memory device sockets included in a first temperature zone (i.e., the "hot" temperature zone) can be located closer to memory sub-system controller 115 than memory device sockets 520 included in the second temperature zone (i.e., the "cold" temperature zone). Each of the first temperature zone 530A and the second temperature zone 530B can be associated with a temperature zone rating 256. As described previously, the temperature zone rating can correspond to a quality rating condition, in some embodiments. For example, a first quality rating condition can be associated with first temperature zone 530A and a second quality rating condition can be associated with second temperature zone 530B.

Referring back to FIG. 3, at operation 330, the processing device assigns the memory device 130, 140 to be installed at a first memory device socket of the first temperature zone. At operation 340, the processing device assigns the memory device to be installed at a memory device socket of a second temperature zone.

Figure 5C:
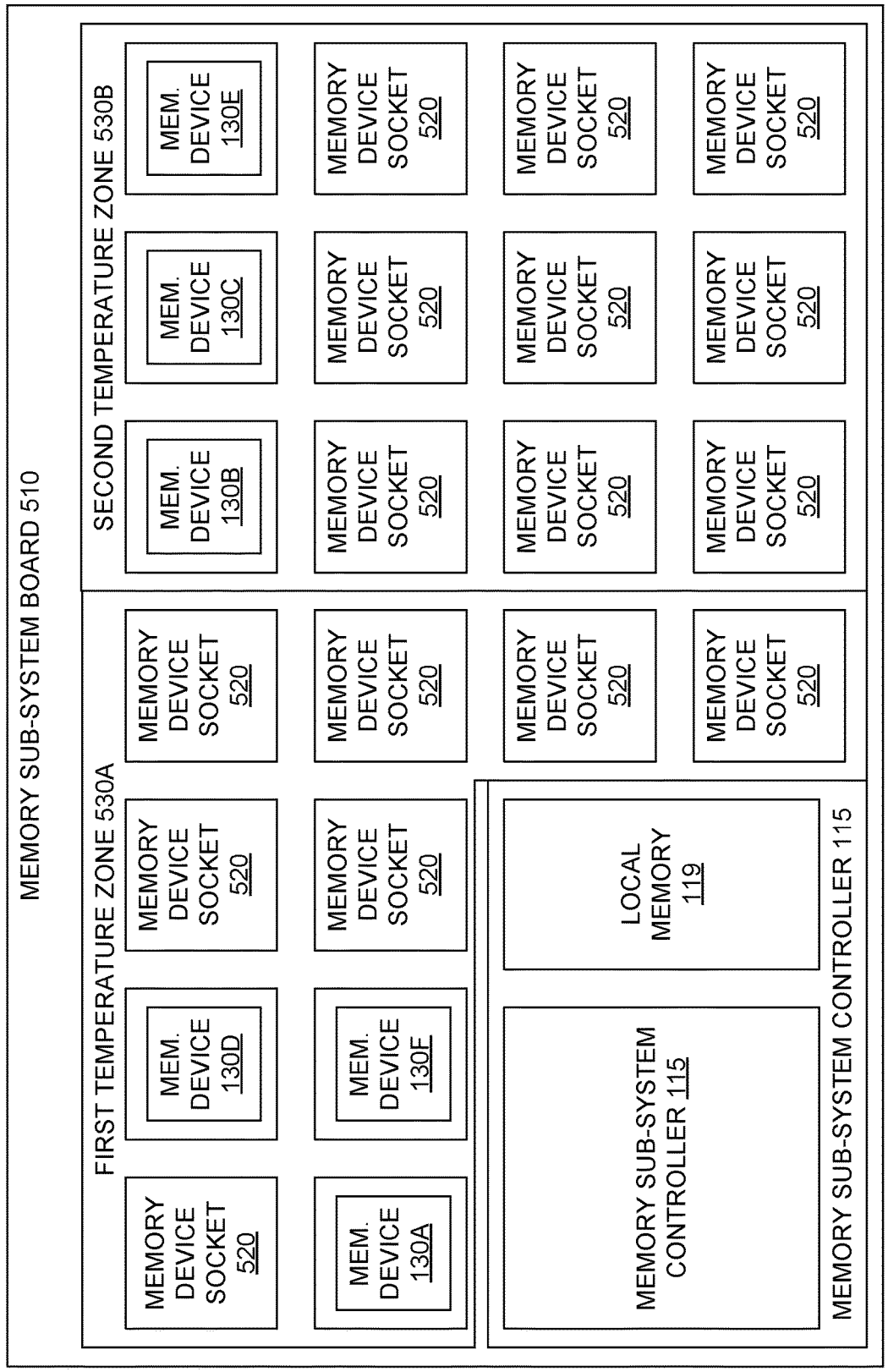

Referring now to FIG. 5C, the processing device described with respect to FIG. 3 can assign memory device 130A to be installed at a memory device socket 520 of first temperature zone 530A responsive to determining the quality rating of memory device 130A satisfies the first quality rating condition of the first temperature zone 530A. The processing device can assign memory device 130B to be installed at a memory device socket 520 of second temperature zone 530B responsive to determining the quality rating of memory device 130A does not satisfy the first quality rating condition.

In some embodiments, memory sub-system board 510 can include more than two temperature zones (not shown). For example, the memory sub-system board 510 can include a third temperature zone. In such embodiments, responsive to determining a quality rating 254 of a memory device 130, 140 does not satisfy the first quality rating condition of the first temperature zone 530A, the processing device described with respect to FIG. 3 can further determine whether a quality rating 254 of a memory device 130, 140 satisfies the second quality rating condition of the second temperature zone 530B. Responsive to determining the quality rating 254 of the memory device 130, 140 satisfies the second quality rating condition, the processing device can assign the memory device 130, 140 to be installed at the second temperature zone 530B of memory sub-system board 510. Responsive to determining the quality rating 254 of the memory device 130, 140 does not satisfy the second quality rating condition, the processing device can assign the memory device 130, 140 to be installed at the third temperature zone (not shown) of memory sub-system board 510.

Figure 4:
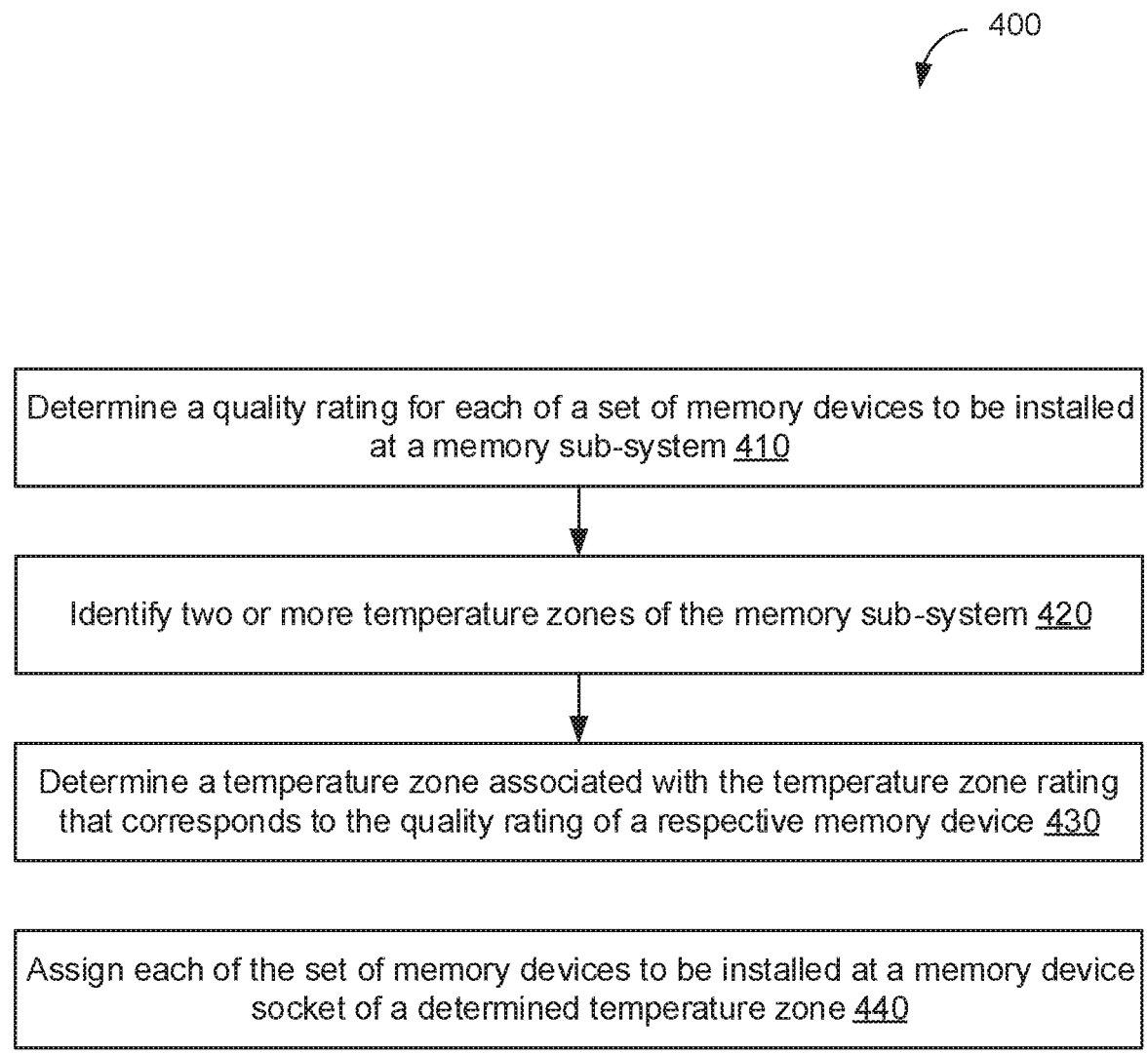
FIG. 4 is a flow diagram of a method to assign a set of memory devices to memory device sockets of a memory sub-system, in accordance with some embodiments of the present disclosure.

FIG. 4 is a flow diagram of a method 400 to assign a set of memory devices to memory device sockets of a memory sub-system, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the manufacturing component 212 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 5D:
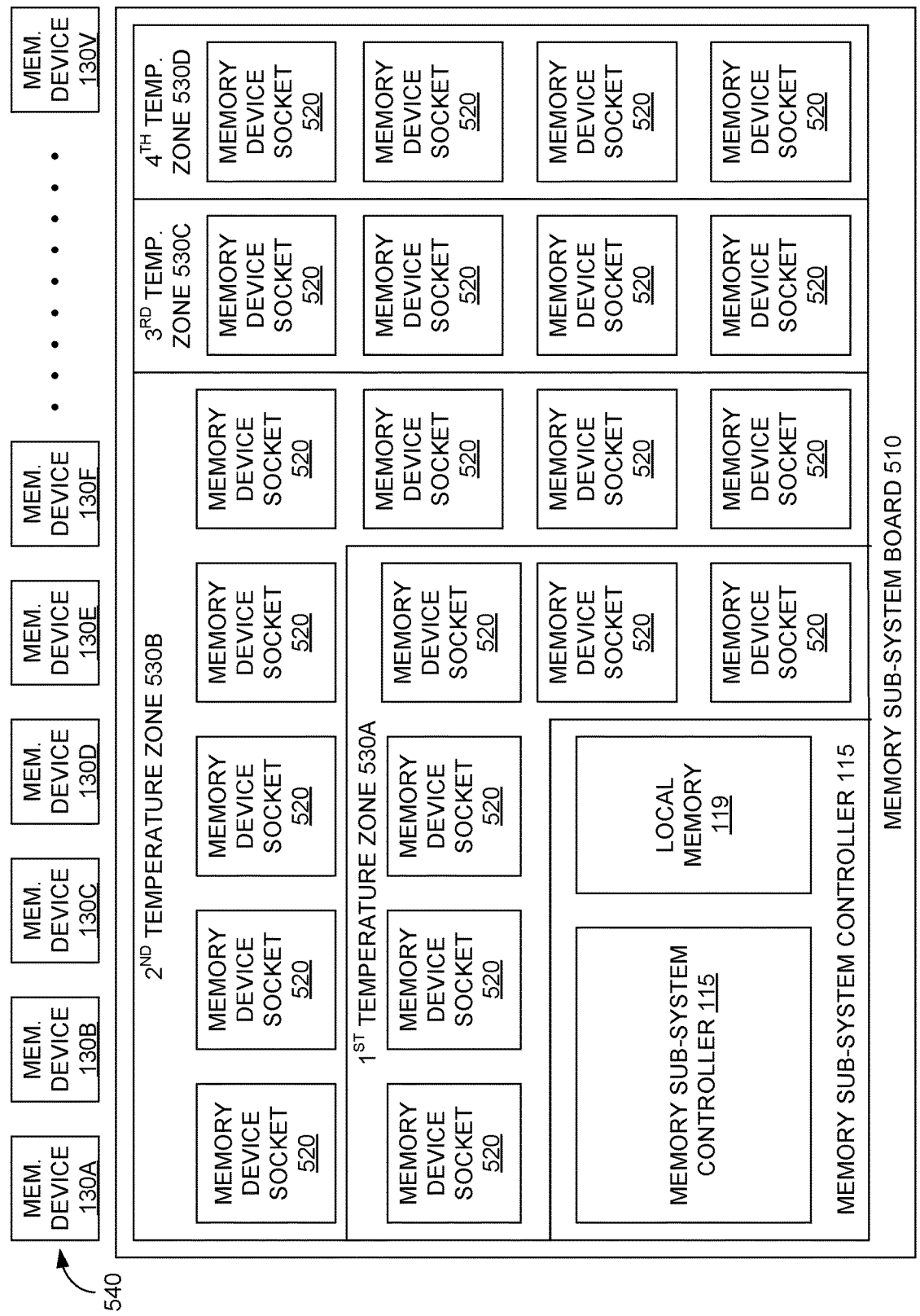

At operation 410, the processing device determines a quality rating 254 for each of a set of memory devices to be installed at a memory sub-system. Each quality rating 254 can correspond to a performance of a respective memory device 130, 140 at one or more temperature conditions. The processing device can determine a quality rating 254 for each of the set of memory devices in accordance with previously described embodiments. In some embodiments, the quality rating 254 of each of the set of memory devices can correspond to a performance ranking of the memory devices. For example, a first memory device 130, 140 of the set of memory devices associated with a highest performance can be associated with a highest quality rating 254 and a second memory device 130, 140 of the set of memory devices associated with a lowest performance can be associated with a lowest quality rating 254. Referring to FIG. 5D, a set of memory devices 540 to be installed at memory sub-system board 510 can be provided. A number of memory devices 130 included in the set of memory devices 540 can correspond to a number of memory device sockets 520 of memory sub-system board 510.

Referring back to FIG. 4, at operation 420, the processing device identifies two or more temperature zones of the memory sub-system. Each temperature zone of the memory sub-system can be associated with a temperature zone rating. Referring back to FIG. 5D, memory sub-system board 510 can include two or more temperature zones 530. In an illustrative example, memory sub-system board 510 can include a first temperature zone 530A, a second temperature zone 530B, a third temperature zone 530C, and a fourth temperature zone 530D. Each temperature zone 530 can be associated with a temperature zone rating 256. In some embodiments, the temperature zone rating can correspond to a socket temperature rating 258 of memory device sockets 520 included in the temperature zone 530. For example, a socket temperature rating 258 of each memory device socket 520 included in the first temperature zone 530A can be higher than a socket temperature rating 258 of each memory device socket 520 included in the second temperature zone 530B.

Referring back to FIG. 4, at operation 430, the processing device determines a temperature zone associated with the temperature zone rating 256 that corresponds to the quality rating 254 of a respective memory device 130, 140. At operation 440, the processing device assigns each of the set of memory devices to be installed at a memory device socket of a determined temperature zone.

Figure 5E:
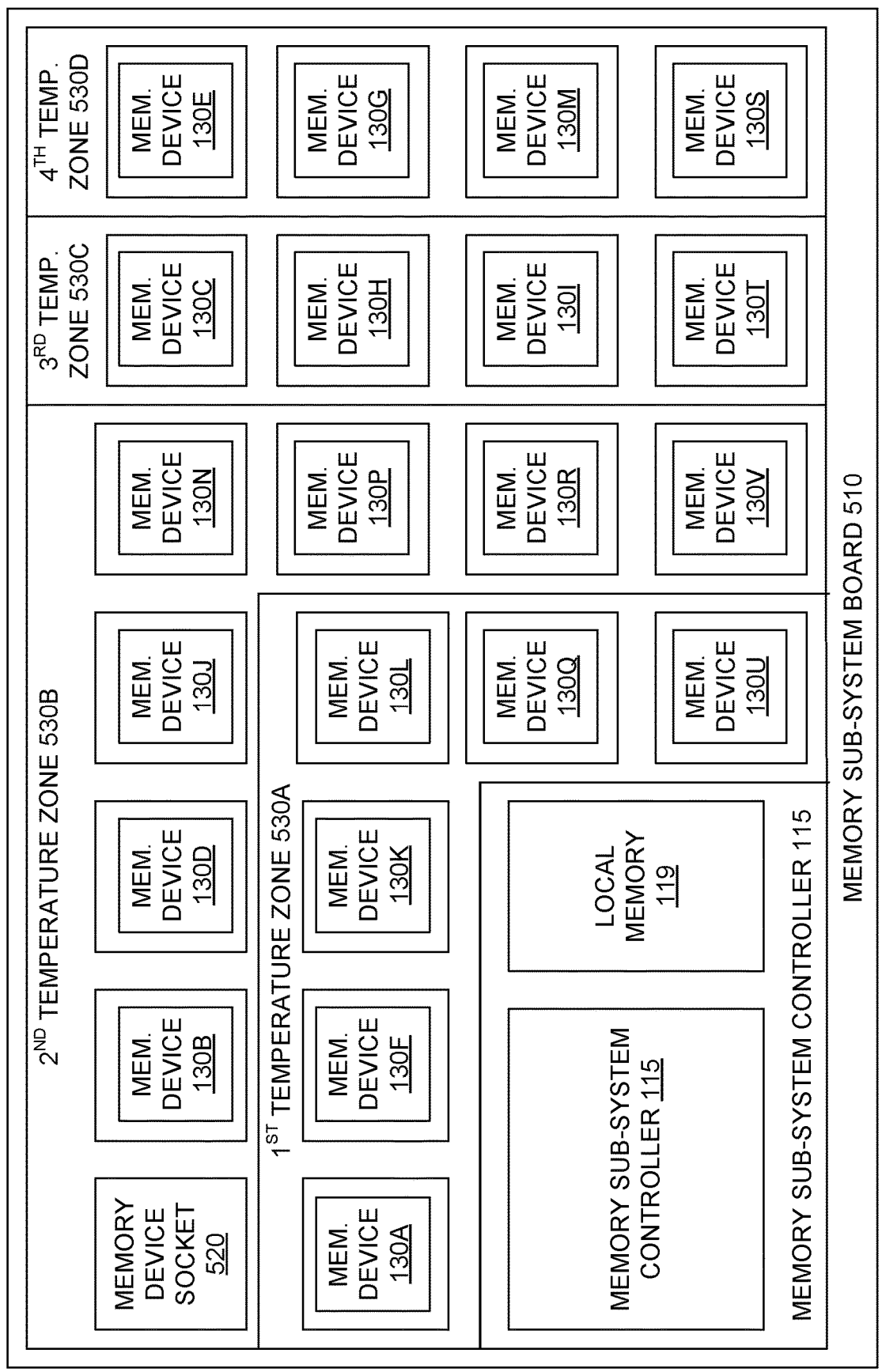

In some embodiments, the processing device can determine the memory devices of the set of memory devices having the highest quality ratings 254 are associated with the temperature zone having the highest temperature zone rating 256. Referring to FIG. 5E, memory devices 130A, 130F, 130K, 130L, 130Q, and 130U can each have the highest quality ratings 254 of the set of memory devices 540. As such, the processing device described with respect to FIG. 4 can determine that the quality ratings of memory devices 130A, 130F, 130K, 130L, 130Q, and 130U are associated with the temperature zone rating 256 of the first temperature zone 530A. Based on this determination, the processing device can assign memory devices 130A, 130F, 130K, 130L, 130Q, and 130U to be installed at memory device sockets of first temperature zone 530A. Similarly, memory devices 130E, 130G, 130M, and 130S can be associated with the lowest quality ratings 254 of the set of memory devices 540. As such, the processing device can determine that the quality ratings 254 of memory devices 130E, 130G, 130M, and 130S are associated with the temperature zone rating 256 of fourth temperature zone 530D. Based on this determination, the processing device can assign memory devices 130E, 130G, 130M, and 130S to be installed at memory device sockets 520 of fourth temperature zone 530D. The processing device can assign the remaining memory devices 130 of the set of memory devices 540 to be installed at memory device sockets 510 of second temperature zone 530B or third temperature zone 530C, in accordance with previously described embodiments.

Figure 6:
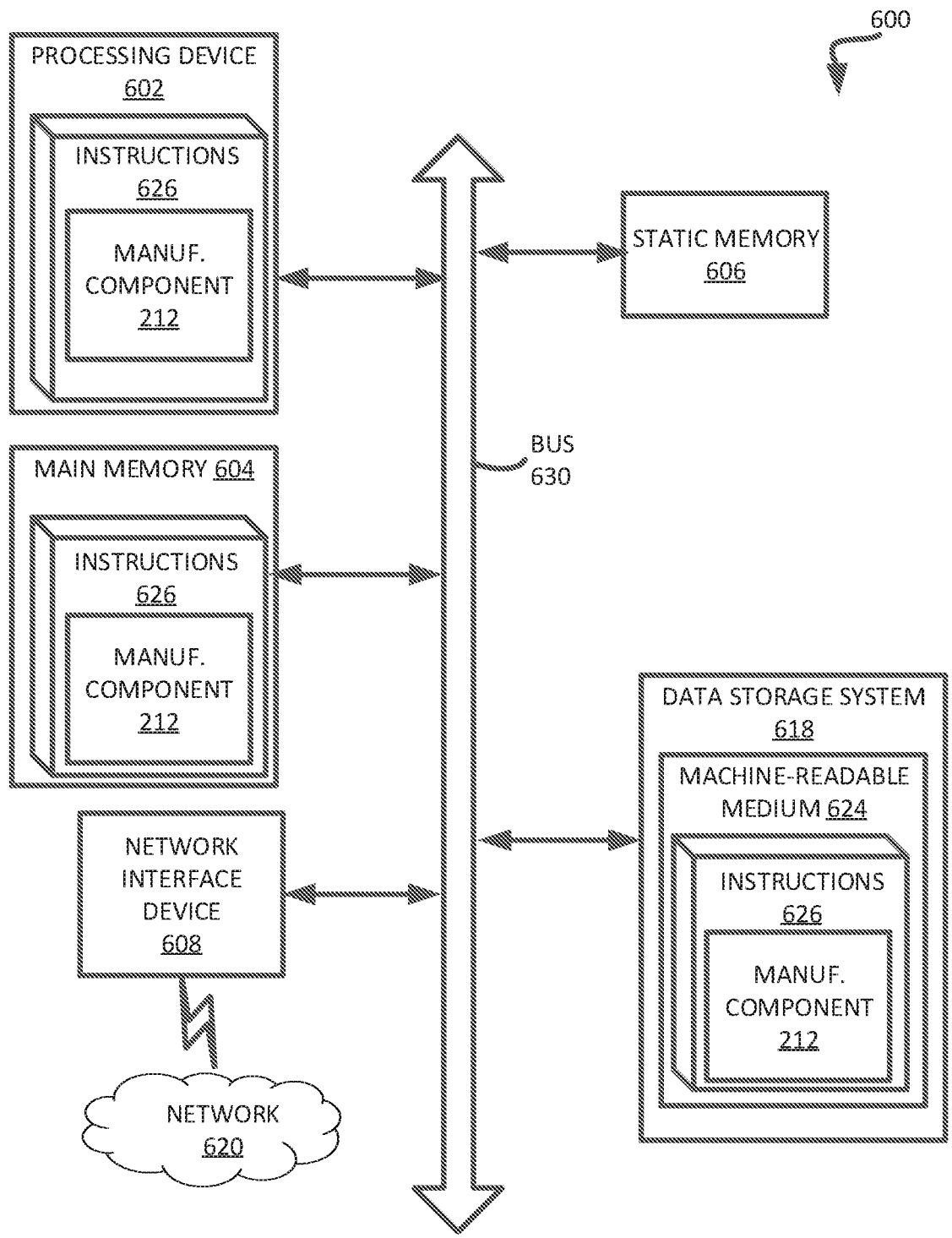
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a server of a manufacturing environment (e.g., the manufacturing environment 200 of FIG. 2) that manufactures a memory sub-system (e.g., the memory sub-system 110 of FIG. 1) In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the server 210 of FIG. 2.

In one embodiment, the instructions 626 include instructions to implement functionality corresponding to a manufacturing component (e.g., the manufacturing component 212 of FIG. 2). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
    identifying data associated with a memory device to be installed at a memory sub-system, wherein the data indicates a first performance of one or more memory operations measured at the memory device at a first operating temperature and a second performance of the one or more memory operations measured at the memory device at a second operating temperature;
    determining a quality rating for the memory device based on the identified data, wherein the quality rating corresponds to a performance metric indicating at least one of the first performance or the second performance of the memory device;
    determining whether the quality rating for the memory device exceeds a first quality rating threshold associated with a first temperature zone of a plurality of temperature zones of the memory sub-system; and
    responsive to determining the quality rating for the memory device exceeds the first quality rating threshold, assigning the memory device to be installed at a first memory device socket of the first temperature zone.

2. The method of claim 1, further comprising:
    responsive to determining the quality rating for the memory device does not exceed the first quality rating threshold, assigning the memory device to be installed at a second memory device socket of a second temperature zone of the plurality of temperature zones.

3. The method of claim 2, further comprising:
    determining one or more memory device sockets included in the first temperature zone and the second temperature zone.

4. The method of claim 3, wherein determining the one or more memory device sockets included in the first temperature zone and the second temperature zone comprises:
    identifying a first set of memory device sockets and a second set of memory device sockets of the memory sub-system, wherein each of the first set of memory device sockets are positioned closer to a processing device of the memory sub-system than each of the second set of memory device sockets; and
    assigning each of the first set of memory device sockets to be included in the first temperature zone and each of the second set of memory device sockets to be included in the second temperature zone.

5. The method of claim 3, wherein determining the one or more memory device sockets included in the first temperature zone and the second temperature zone comprises:
    determining a socket temperature rating associated with each memory device socket of the memory sub-system;
    determining a number of temperature zones to be included in the plurality of temperature zones; and
    determining, based on the socket temperature rating associated with each memory device socket and the number of temperature zones to be included in the plurality of temperature zones, a first set of memory device sockets to be included in the first temperature zone and a second set of memory device sockets to be included in the second temperature zone.

6. The method of claim 5, wherein determining the socket temperature rating associated with each memory device socket of the memory sub-system comprises:
    running a simulation of one or more operations performed at a simulated memory device installed at each memory device socket of the memory sub-system, wherein an output of the simulation comprises an operating temperature of each simulated memory device during performance of the one or more operations,
    wherein the socket temperature rating associated with each memory device socket is based on the output of the simulation.

7. The method of claim 1, wherein determining the quality rating for the memory device comprises:
    testing the performance of the memory device by:
        setting the first operating temperature for the memory device;
        measuring the first performance of one or more memory operations at the memory device at the first operating temperature;
        setting the second operating temperature for the memory device; and
        measuring the second performance of the one or more memory operations at the memory device at the second operating temperature,
    wherein the quality rating corresponds to a difference between the first performance and the second performance.

8. The method of claim 1, wherein the first quality rating threshold corresponds to a socket temperature rating for each memory device socket included in the first temperature zone.

9. A system comprising:
    a memory device; and
    a processing device operatively coupled to the memory device, the processing device to:
        identify data associated with a set of memory devices to be installed at a memory sub-system, wherein the data indicates a first performance of one or more memory operations measured at a respective memory device of the set of memory devices at a first operating temperature and a second performance of the one or more memory operations measured at the respective memory device at a second operating temperature;

determine a quality rating for each of the set of memory devices based on the identified data, wherein each quality rating corresponds to a performance metric indicating at least one of the first performance or the second performance of the respective memory device;

identify, at the memory sub-system, a plurality of temperature zones each comprising one or more memory device sockets, wherein each of the plurality of temperature zones is associated with a temperature zone rating;

determine, for each of the set of memory devices, a temperature zone of the plurality of temperature zones associated with the temperature zone rating that corresponds to the quality rating of a respective memory device; and assign each of the set of memory devices to be installed at a memory device socket of a determined temperature zone.

10. The system of claim 9, wherein the processing device is further to:

determine the one or more memory device sockets included in each of the plurality of temperature zones.

11. The system of claim 10, wherein to determine the one or more memory device sockets included in each of the plurality of temperature zones, the processing device is further to:

identify a first set of memory device sockets and a second set of memory device sockets of the memory sub-system, wherein each of the first set of memory device sockets are positioned closer to a processing device of the memory sub-system than each of the second set of memory device sockets; and assign each of the first set of memory device sockets to be included in a first temperature zone of the plurality of temperature zones and each of the second set of memory devices to be included in a second temperature zone of the plurality of temperature zones.

12. The system of claim 10, wherein to determine the one or more memory device sockets included in each of the plurality of temperature zones, the processing device is to:

determine a socket temperature rating associated with each memory device socket of the memory sub-system;

determine a number of temperature zones to be included in the plurality of temperature zones; and determine, based on the socket temperature rating associated with each memory device socket and the number of temperature zones to be included in the plurality of temperature zones, a first set of memory device sockets to be included in a first temperature zone of the plurality of temperature zones and a second set of memory device sockets to be included in a second temperature zone of the plurality of temperature zones.

13. The system of claim 12, wherein to determine the socket temperature rating associated with each memory device socket of the memory sub-system, the processing device is further to:

run a simulation of one or more operations performed at a simulated memory device installed at each memory device socket of the memory sub-system, wherein an output of the simulation comprises an operating temperature of each simulated memory device during performance of the one or more operations, wherein the socket temperature rating associated with each memory device socket is based on the output of the simulation.

14. The system of claim 9, wherein to determine the quality ranking for each of the set of memory devices to be installed at the memory sub-system, the processing device is to:

test the performance of a memory device of the set of memory devices by:
setting the first operating temperature for the memory device;
measuring the first performance of one or more memory operations at the memory device at the first operating temperature;
setting the second operating temperature for the memory device; and
measuring the second performance of the one or more memory operations at the memory device at the second operating temperature, wherein the quality rating corresponds to a difference between the first performance and the second performance.

15. The system of claim 9, wherein the temperature zone rating for a temperature zone of the plurality of temperature zones corresponds to a socket temperature rating for each memory device socket included in the temperature zone.

16. A non-transitory computer-readable storage medium comprising instructions that, when executed by a processing device, cause the processing device to:

identify data associated with a memory device to be installed at a memory sub-system, wherein the data indicates a first performance of one or more memory operations measured at the memory device at a first operating temperature and a second performance of the one or more memory operations measured at the memory device at a second operating temperature;

determine a quality rating for the memory device based on the identified data, wherein the quality rating corresponds to a performance metric indicating at least one of the first performance or the second performance of the memory device;

determine whether the quality rating for the memory device exceeds a first quality rating threshold associated with a first temperature zone of a plurality of temperature zones of the memory sub-system; and responsive to determining the quality rating for the memory device exceeds the first quality rating threshold, assigning the memory device to be installed at a first memory device socket of the first temperature zone.

17. The non-transitory computer-readable storage medium of claim 16, wherein the processing device is further to:

responsive to determining the quality rating for the memory device does not exceed the first quality rating threshold, assigning the memory device to be installed at a second memory device socket of a second temperature zone of the plurality of temperature zones.

18. The non-transitory computer-readable storage medium of claim 17, wherein the processing device is further to:

determine one or more memory device sockets included in the first temperature zone and the second temperature zone.

19. The non-transitory computer-readable storage medium of claim 18, wherein to determine the one or more memory device sockets included in the first temperature zone and the second temperature zone, the processing device is to:

identify a first set of memory device sockets and a second set of memory device sockets of the memory sub-system, wherein each of the first set of memory device sockets are positioned closer to a processing device of the memory sub-system than each of the second set of memory device sockets; and assign each of the first set of memory device sockets to be included in the first temperature zone and each of the second set of memory device sockets to be included in the second temperature zone.

20. The non-transitory computer-readable storage medium of claim 18, wherein to determine the one or more memory device sockets included in the first temperature zone and the second temperature zone, the processing device is to:

determine a socket temperature rating associated with each memory device socket of the memory sub-system;

determine a number of temperature zones to be included in the plurality of temperature zones; and determine, based on the socket temperature rating associated with each memory device socket and the number of temperature zones to be included in the plurality of temperature zones, a first set of memory device sockets to be included in the first temperature zone and a second set of memory device sockets to be included in the second temperature zone.

\* \* \* \* \*